Figure 1:
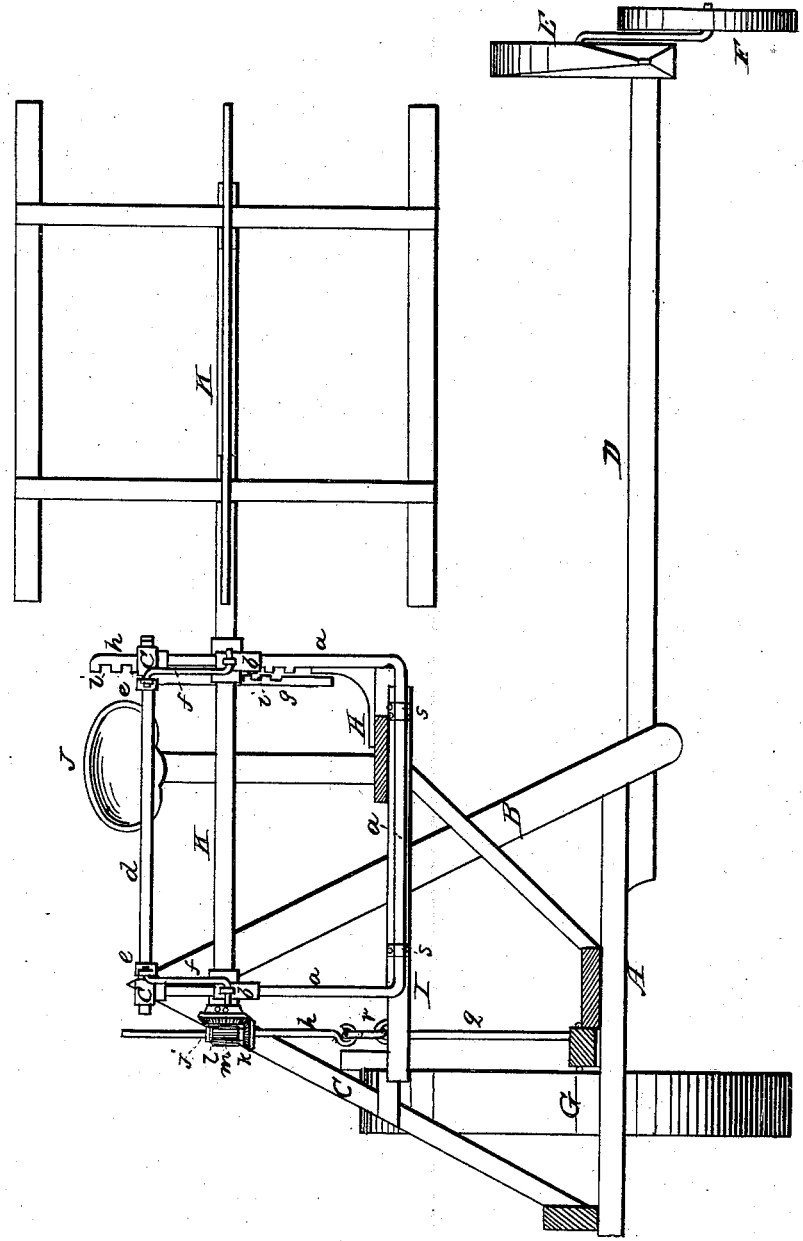

C. W. & W. W. MARSH.
HARVESTER-REEL.

No. 187,543. Patented Feb. 20, 1877.

WITNESSES:
O. W. Bond
D. Beadley

INVENTORS:
Chas. W. Marsh
Wm. W. Marsh
By West & Bond Attys.

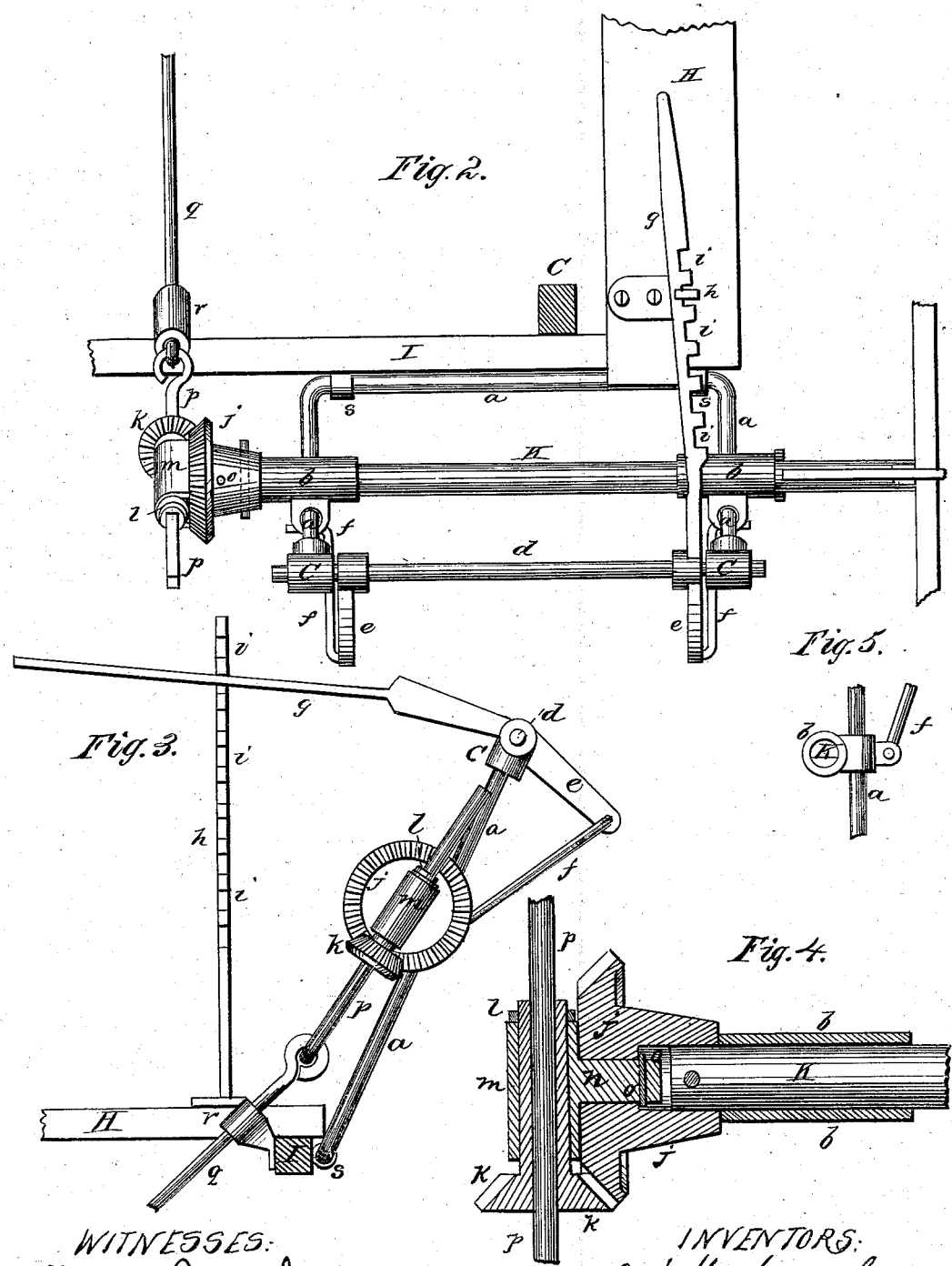

UNITED STATES PATENT OFFICE.

CHARLES W. MARSH AND WILLIAM W. MARSH, OF SYCAMORE, ILLINOIS.

IMPROVEMENT IN HARVESTER-REELS.

Specification forming part of Letters Patent No. 187,543, dated February 20, 1877; application filed October 25, 1875.

*To all whom it may concern:*

Be it known that we, CHARLES W. MARSH and WILLIAM W. MARSH, of Sycamore, De Kalb county, State of Illinois, have invented new and useful Improvements in Harvester-Reels, of which the following is a full description, reference being had to the accompanying drawings, in which—

Figure 1 is a front view; Fig. 2, a plan view of the reel attachment; Fig. 3, an end view of the parts shown at Fig. 2; and Fig. 4, a detail of the driving-gearing; Fig. 5, a detail of the sliding journal.

The nature of this invention consists in hanging the reel so as to give it a free vertical and front and rear adjustment, in adjusting the parts, and connecting them with levers, so as to enable the driver or operator to adjust the reel while the machine is in motion, and in so constructing and arranging the driving-gear that the reel will revolve freely in any position in which it may be placed without binding or straining any of the parts of the machine.

In the drawings, in the form shown, A B C represent the main and elevator frames; D, the cutter-bar; E, the divider; F, the grain-wheel; G, the main wheel; H, the driver's platform; I, the cross-bar, to which the driver's platform and the reel-supports are attached; J, the driver's seat; K, the wheel-shaft; $a$, the reel-support; $b$, the sliding journal-bearings; $c$, the journal-bearings at the upper ends of the reel-support; $d$, the lever-shaft; $e$, the arms; $f$, the connecting-rods; $g$, the lever; $h$, the standard or post for holding the lever $g$; $i$, the series of notches in the post $h$ or lever $g$; $j$, the miter-wheel on the reel-shaft; $k$, the miter-pinion for driving the wheel-shaft; $l$, the collar on the pinion $k$; $m$, the journal-bearing for the pinion; $n$, the shaft of the journal-bearing $m$; $o$, the pin or fastening for the shaft $n$; $p$, angular rod passing through the pinion $k$; $q$, the rod connecting the rod $p$ with the driving-gear from the main wheel; $r$, the journal of the rod or shaft $q$; $s$, the loops or hinges for the support $a$.

All of the parts from A to J inclusive may be constructed in any of the usual or well-known forms, as we do not limit the use of our reel to the particular machine shown.

The reel-support $a$, in order to give it strength without unnecessary weight, is made of gas-pipe, or other suitable metal tubing, and is, by preference, hinged to the frame on a line nearly horizontal with the lower fan, when such fan is at its lowest point. The arms of the reel-support are placed sufficiently far apart to give the reel a strong support and a steady motion. On these arms or supports are placed the sliding journals $b$ of the reel-shaft, which slide freely up and down on the support, and are raised and lowered as the frame is swung from horizontal to vertical or vertical to horizontal.

The upper ends of the bar or bars forming the support are connected together by the shaft $d$, which is journaled on them, as shown, and to which are permanently connected the arms $e$, which extend forward. As shown, these arms are connected with the sliding bearings $b$ of the reel-shaft by the rods $f$. At the inner end of the shaft $d$ a lever, $g$, is attached, which extends back sufficiently near to the driver's seat to enable him to handle it with ease.

This lever $g$ is provided on its edge with a series of notches, $i$, which engage with the post $h$. By the use of these notches $i$, the front or rear adjustment of the reel is effected. The post $h$ is also provided with a series of notches, $i$, by the use of which the reel is adjusted vertically. These adjustments may be made separately, or a combined adjustment may be made by a single movement of the lever $g$. All of these adjustments may be made while the machine is in motion.

When it is not desirable to bring the lever $g$ within reach of the driver, holes and a pin may be substituted for the notches $i$ shown in the lever $g$ and post $h$.

In order to maintain a steady movement of the reel the journal-bearing of the driving-pinion is made to slide on the bar or angular shaft $p$. This journal-bearing is journaled into the wheel $j$ of the reel-shaft, as shown in Fig. 1. By this arrangement, whenever the position of the reel is changed upon its bearings, the pinion $k$ is kept in gear. The shaft $l$ of the pinion $k$ is provided with an angular opening fitting the shaft $p$, which prevents the pinion $k$ from sliding. The pinion $k$ revolves by means of the shaft $l$ in the bearing $m$, so that whatever the position of the shaft $p$ may be it will revolve freely.

The shaft $p$ is connected with the shaft $q$ by a loop or other universal joint, so as to prevent binding as the reel-support is swung backward or forward.

The shaft $q$ may be driven directly from the main wheel, or by the use of any suitable intervening gearing, according to the construction of the driving-wheel, or of the machine to which it may be attached.

By this arrangement the reel is at all times properly and evenly driven, and the driver can shift the reel as the grain in the field may change from short to tall, or from straight to lodged; and, as seen, it may be raised or lowered without changing its position relative to the cutting-line, or it may be adjusted toward the front or rear without raising or lowering it, or both motions, or a resultant from both, may be given it at the same time.

The post $h$ may be made a simple notched bar, and be attached to the machine in different ways, according to the construction of the frame-work, and the pinion $k$ may have its shaft $l$ solid, by projecting an angular center-piece below, which will fit into a telescopic section of the rod $p$.

In use a proper safety attachment will be applied to prevent careless drivers from letting the reel fall onto the ground.

What we claim as new, and desire to secure by Letters Patent, is as follows:

1. The combination of the supporting-frame $a$ and shaft $d$, with the lever $g$ and post or lock $h$, for effecting the front or rear adjustment, substantially as specified.

2. The combination of the sliding journal-bearings $b$, with the arms $e$, rods $f$, and lever $g$, for adjusting the reel vertically, substantially as specified.

3. The combination of the frame $a$, lever $g$, shaft $d$, arms $e$, rods $f$, and sliding journals $b$, with the reel-shaft K, for effecting both adjustments by a single movement, substantially as described.

4. The combination of the reel-shaft K, pivoted frame $a$, and sliding journal-bearings $b$, with the wheel $f$, pinion $k$, and rod or shaft $p$, for maintaining motion by gearing in all positions, substantially as set forth.

5. In a harvester, the sliding bearings $b$, in combination with the pivoted frame $a$, swinging in the first quarter of a circle, and reel-shaft K, substantially as and for the purpose set forth.

CHARLES W. MARSH.
WILLIAM W. MARSH.

Witnesses:
L. L. BOND,
O. W. BOND.